United States Patent
Hoffschmidt et al.

[11] Patent Number: 6,003,508
[45] Date of Patent: Dec. 21, 1999

[54] SOLAR RECEIVER

[75] Inventors: Bernhard Hoffschmidt, Bergisch Gladbach; Robert Pitz-Paal, Troisdorf; Peter Rietbrock, Cologne; Manfred Boehmer, Lohmar, all of Germany

[73] Assignee: Deutsches Zentrum fuer Luft- und Raumfahrt e.V., Germany

[21] Appl. No.: 09/161,453

[22] Filed: Sep. 28, 1998

[30] Foreign Application Priority Data

Oct. 9, 1997 [DE] Germany ............... 197 44 541

[51] Int. Cl.⁶ ........................................... F24J 2/02
[52] U.S. Cl. .................... 126/680; 126/674; 126/714
[58] Field of Search ............................. 126/680, 681, 126/674, 714

[56] References Cited

U.S. PATENT DOCUMENTS

| | | | |
|---|---|---|---|
| 4,186,721 | 2/1980 | Whitman | 126/674 |
| 4,683,872 | 8/1987 | Fricker | 126/674 |
| 4,777,935 | 10/1988 | Fricker | 126/674 |
| 4,913,129 | 4/1990 | Kelly et al. | 126/681 |
| 5,483,950 | 1/1996 | Keintzel et al. | 126/680 |
| 5,715,809 | 2/1998 | Schmitz-Goeb et al. | 126/680 |
| 5,797,387 | 8/1998 | Fend et al. | 126/680 |

FOREIGN PATENT DOCUMENTS 4223779 7/1992 Germany.

Primary Examiner—Ira S. Lazarus
Assistant Examiner—Sara Clarke
Attorney, Agent, or Firm—Diller, Ramik & Wight, PC

[57] ABSTRACT

A solar receiver (1) for a solar-thermal power plant, comprising a receiver surface (2) facing towards the concentrated incident solar radiation (8) and including a plurality of mutually spaced absorber bodies (3), is provided with gas channels arranged between the absorber bodies (3) for supplying a gas or gaseous mixture (11) adapted to absorb solar radiation (8) to a region located in front of the receiver surface (2). In this region, the gas (11) will absorb a part of the incident solar radiation (8) and then will be sucked together with the ambient air (9) through the absorber bodies (3) to be further heated therein.

11 Claims, 2 Drawing Sheets

SOLAR RECEIVER

The present invention relates to a solar receiver for a solar-thermal power plant, comprising a plurality of absorber bodies, and a method for operating a solar receiver.

BACKGROUND OF THE INVENTION

In a solar-thermal power plant, heliostats or collectors are used to focus the incident solar radiation onto a solar receiver which is commonly assembled from a large number of ceramic absorber bodies. The highly concentrated solar radiation incident on the absorber body is about 200 to 300 times stronger than the natural radiation of the sun; as a result, temperatures above 1000° C. are generated in the absorber body. Due to such high temperatures, metals are not useful as materials for the absorber. Instead, use is made of highly temperature-resistent ceramics, e.g. silicon carbide or silicon silicon carbide.

Basically, two constructional designs are known for absorbers: that of a volumetric absorber and that of a direct-absorption absorber. Volumetric absorbers comprise absorber arrays made from metallic or ceramic honeycomb structures, reticulated structures or foams. The absorber arrays will absorb the solar radiation while having a fluid, e.g. ambient air in case of an open volumetric absorber, flowing therethrough. The fluid is convectively heated and supplied to a subsequent process such as a steam-turbine process. In absorbers for direct absorption, dark particles conveyed in a gas or a liquid are exposed to the solar radiation so that the particles will absorb the solar radiation and thus heat the gas or the liquid.

The source of energy of solar-thermal power plants is the radiation of the sun which, in contrast to the energy sources of conventional steam generators, is not adjustable and is subjected to continuous change depending on the position of the sun as determined by the time of day and the seasons of the year. The latter factors cause changes both in the intensity of the incident radiation and in the distribution of the incident radiation on the solar receiver. To utilize the energy in the heat-carrier medium in an optimum manner, the outlet temperature of the heat-carrier medium across the cross section of the receiver should be as constant as possible.

For this purpose, the mass flow distribution of the heat-carrier medium across the receiver surface has to be adapted corresponding to the distribution of the intensity of the incident radiation.

Usually, an active control of the mass flow distribution of the heat-carrier medium is precluded by the high temperatures possibly in excess of 1000° C. and by the costs incurred. As a result, a homogeneous outlet temperature can normally be obtained only for one design point. The design point of the mass flow distribution is normally selected to obtain an energetic maximum, averaged over the year, for the respective design. This means that the design is based on an average distribution of the incident radiation. Deviations of the actual distribution of the incident radiation from the above average distribution tend to cause local overheating of parts of the receiver. In practice, such incidents lead to a decrease of the irradiation onto the solar receiver so that the plant will not be able to utilize the maximum of the potentially available concentrated solar radiation.

Known from DE 42 23 779 C1 is a solar plant comprising an absorber body adapted for suctional intake of ambient air which after intake will be convectively heated by an absorber body. The absorber body has tubular channels extending therethrough for infeed of preheated air from the rear of the absorber so that the preheated air is guided through the absorber to a region externally before the absorber body. In this region, the preheated air mixes with the ambient air and is sucked into the absorber to be further heated therein. It has been observed that the preheated air discharged from a certain number of tubes has a high discharge velocity so that a considerable part of the preheated air will flow beyond the intake region of the absorber and therefore not be available anymore for the process. As a countermeasure, baffle bodies can be arranged in front of the tube outlets for deflecting the discharged preheated air towards the absorber. Since this region of the solar plant is exposed to very high temperatures, the design and the attachment of these deflecting bodies are very complex.

It is an object of the invention to increase the efficiency of a solar receiver, particularly in that the receiver can be used over a wide range of temperatures.

SUMMARY OF THE INVENTION

According to the instant invention, it is proposed to combine a volumetric absorber with a direct-absorption absorber. Thus, the solar receiver of the invention comprises a receiver surface facing towards the incident solar radiation and formed of a plurality of mutually spaced absorber bodies. Provided between the absorber bodies are gas channels arranged to supply a solar-radiation-absorbing gas or gaseous mixture to a region externally in front of the receiver surface. The gas channels are formed by the lateral surfaces of the absorber bodies so that each absorber body has its sides completely surrounded by gas channels. In normal use, the solar receiver is operative as an open volumetric absorber, i.e. the incident solar radiation will heat the absorber bodies and ambient air, serving as a heat-carrier medium, will flow through the absorber bodies from the front. In the process, the ambient air is convectively heated while cooling the absorber bodies. If an overheating of absorber bodies is to be expected due to excessive solar radiation, a gas or gaseous mixture, e.g. air enriched with graphite, is supplied from the rear via the gas channels between the absorber bodies into the region externally in front of the receiver surface. In the region in front of the receiver surface, the gas or gaseous mixture absorbs a part of the incident solar radiation, thereby reducing the radiation onto the absorber body and thus also the rise of temperature in the absorber body. The heated gas along with the ambient air is sucked through the absorber body and is further heated therein. In this manner, overheating of an absorber body can be prevented without leaving incident solar radiation unused.

In the context of the present invention, a gaseous mixture is defined as a gas provided with particles absorbing solar radiation. These particles, e.g. graphite, can also become burnt by the concentrated solar radiation and in this manner transfer the heat to the gas of the gaseous mixture. Likewise suited are colored gases which will absorb the solar radiation directly.

It has been proven that the combination of a volumetric absorber and a direct-absorption absorber is suited also for continuous operation. Since the gas mixture has a higher absorptive capacity than a porous ceramic absorber body, the gas mixture can absorb also ranges of the radiation which are not absorbed by the absorber body. In addition, the gas mixture will recycle the radiation and reflection losses of the absorber body back to the system.

Advantageously, the absorber bodies are respectively arranged on a tubular support member adapted for discharge of the heated air, with the gas channels formed by the support members and the absorber bodies. This offers the advantage that no additional components need be used for the gas channels and that the gas mixture, while conveyed to the receiver surface, will cool the interior of the solar receiver while already being preheated at the same time.

An embodiment of the invention will be explained in greater detail hereunder with reference to the drawings.

DESCRIPTION OF A PREFERRED EMBODIMENT

Figure 1:
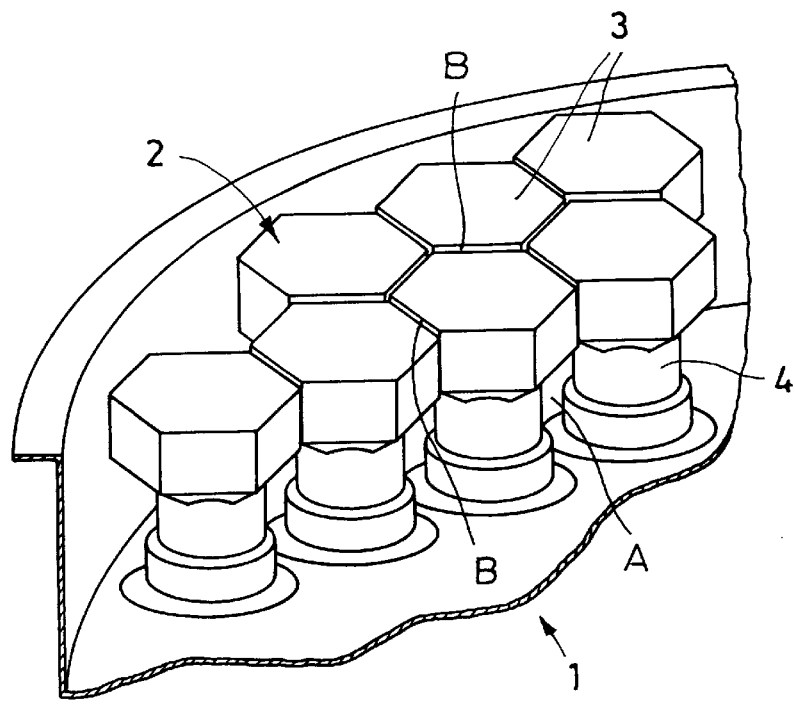
FIG. 1 shows a systematic representation of a solar receiver according to the invention.

In a solar-thermal power plant, solar radiation is focused by means of reflectors, e.g. by heliostats or collectors, onto a solar receiver 1 as shown by way of example in FIG. 1. The receiver surface 2 facing towards the concentrated incident solar radiation comprises a plurality of absorber bodies 3 having hexagonal end faces and made from a porous ceramic material, e.g. silicon carbide. The absorber bodies 3 are permeable to gas in the longitudinal direction so that a heat-carrier medium can flow therethrough for carrying off the heat generated by the solar radiation. The material of the absorber bodies 3 can either comprise open-celled pores configured to provide curved flow channels extending through a plurality of pores, or the material can be formed with linear capillary channels.

The individual absorber bodies 3 are arranged at distances from each other so that expansions of the absorber bodies 3 due to the high temperatures will cause no tensions. In the region of their rear ends facing away from the receiver surface 2, the absorber bodies 3 are mounted to respective support members 4. The support members 4 are provided for suctional intake of ambient air through the absorber bodies 3, with the sucked ambient air being heated at the same time.

Figure 2:
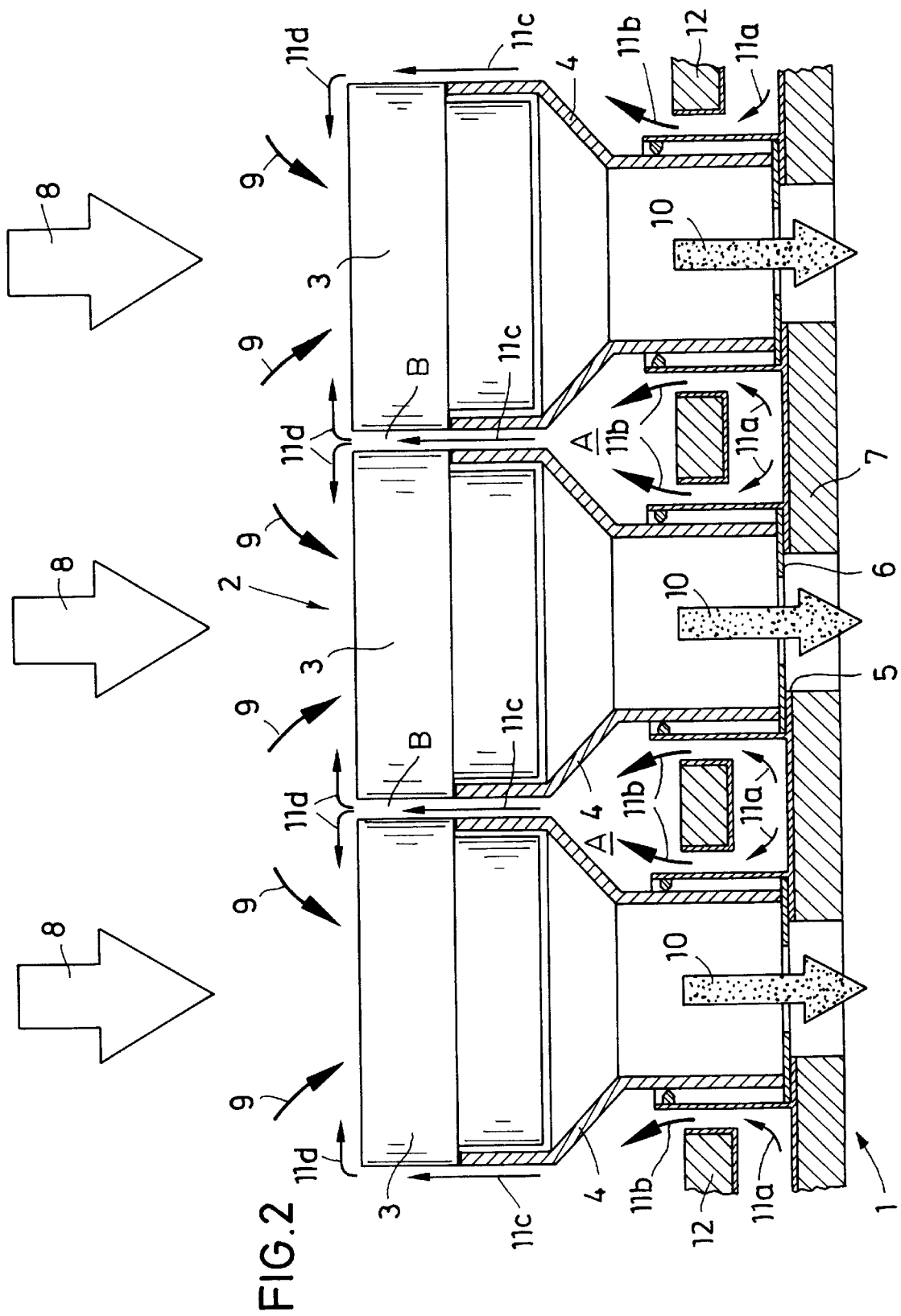
FIG. 2 shows a cross sectional view of the solar receiver.

FIG. 2 shows a cross sectional view of the solar receiver 1. The absorber bodies 3 are fixed in the support members 4 by bonding or press-fitting. The absorber bodies 3 and the support members 4 comprise the same ceramic material, e.g. silicon carbide or silicon silicon carbide, so that both parts are allowed to expand in a uniform manner and their mutual attachment is maintained also in case of high thermal stresses. The support members 4 are of a funnel-like shape; they have a flared front portion for receiving the absorber bodies 3 and a rear portion of reduced diameter for discharge of the heated air. In said region of reduced diameter, the support members 4 are mounted to a support structure 5 of the solar receiver 1. Arranged between the support structure 5 and each of the support members 4 is a screen 6 configured to reduce the flow cross-sectional area for the heat-carrier medium and to provide for an improved flow guidance. An insulating means 7 is arranged behind support structure 5 to protect the metal structure under insulating means 7 from thermal stresses. The support members 4 are connected to suction units, such as ventilators, arranged behind support structure 5 and insulating means 7.

When the solar receiver 1 is in operation, solar radiation 8 is incident onto receiver surface 2. Consequently, the pores of the absorber bodies 3 are heated. Ambient air 9 is sucked by the suction units to pass through the absorber bodies 3, is heated therein and is discharged as heated air 10 through the support members 4 and connecting conduits. A gas 11 adapted to absorb solar radiation 8 is discharged from the base portion of the support members 4 to then be guided by means of deflector bodies 12 along the outer contours of support members 4, as indicated by arrows 11a and 11b.

Defined between the base portions of the funnel-shaped support members 4 are dome-shaped flow chambers A wherein the gas 11 is caused to flow at a relatively slow speed because of the dimensions of the chambers A. In the forward direction, i.e. towards the receiver surface 2, the flow chamber A merges into gas channels B formed by the lateral outer surfaces of support members 4 and the lateral outer surfaces of absorber bodies 3. The gas channels B surround the absorber bodies 3 completely, thereby providing for large-surfaced discharge openings. Therefore, the gas 11 flows out at a low speed and accordingly will in any case remain in the intake region externally before the receiver surface 2. As indicated by the arrows 11d, the gas 11 is distributed externally of the receiver surface 2 and in this region is sucked into absorber bodies 3 together with the ambient air 9. While thus conveyed, the gas 11 is caused to cool the support members 4 and the absorber bodies 3 while itself being heated. In front of receiver surface 2, the gas 11 absorbs a part of the incident solar radiation 8 and is further heated thereby. The gas 11 experiences a further increase of temperature when flowing through absorber body 3 before being passed on for utilization, e.g. in a steam turbine.

The gas 11 can suitably comprise air enriched with graphite. Because of its grey color, this gas has a high absorptivity. When subjected to irradiation, the graphite particles will burn, thereby heating the gas 11. In this case, the absorber body 3 is designed as a self-cleaning filter adapted for residual-free combustion therein. If non-combustible particles are used, the absorber body 3 can additionally take over the function of a separator.

Figure 3:
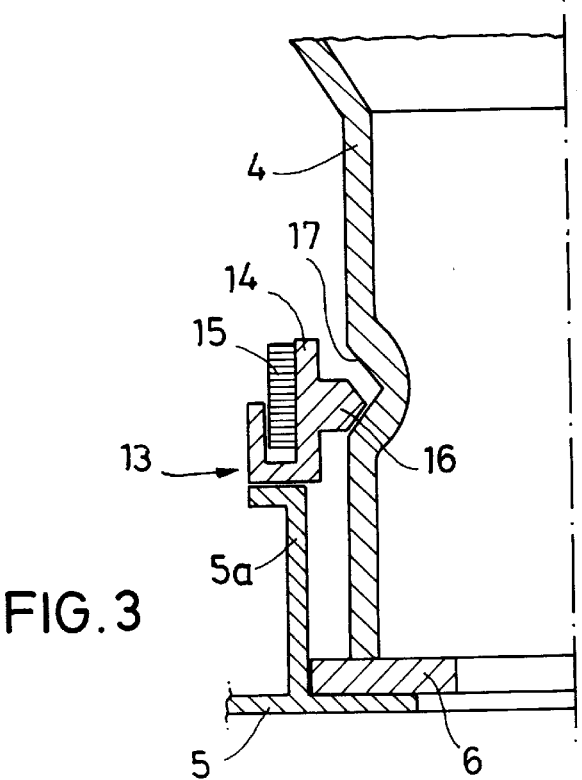
FIG. 3 is a view of a detail of the mounting device for an absorber body of the solar receiver.

With reference to FIG. 3, a mounting device 13 for mounting one of the support members 4 to the support structure 5 will be explained hereunder. In case of damage to an absorber body 3 or a support member 4, it is desirable to replace the damaged component externally from the front, i.e. as viewed from receiver surface 2, because performing any such replacing work internally of the solar receiver 1 would make it necessary to switch off the receiver several days for cooling.

The mounting device 13 comprises a plurality of segment-like engagement elements 14 located along the periphery of support member 4. Each of the engagement elements 14 is arranged for displacement on an arm 5a of support structure 5 in a manner allowing for movement of engagement element 14 in a radial direction, i.e. towards support member 4. The engagement elements 14 are supported against support member 4 by a tensioning means 15, e.g. a highly temperature-resistant elastic metal belt. A limiting abutment means (not shown) is provided to keep the engagement element 14 from falling off the arm 5a when the support member 4 has been withdrawn. Each engagement element 14 has a wedge-shaped projection 16 engaging a wedge-shaped peripheral groove 17 of support member 4. The wedge surfaces of projection 16 and groove 17 are parallel to each other, safe-guarding a firm seat of support member 4 also in case of heat-induced changes of the peripheral or longitudinal dimensions of support member 4.

The support member 4 is mounted by simply pressing it between the arms 5a whereby the tensioning means 15 are forced radially outwards until caught in a locking position in the emplacement 17.

I claim:

1. A solar receiver (1) for a solar-thermal power plant comprising a receiver surface (2) adapted to face towards concentrated incident solar radiation (8), ambient air (9) being used as a heat-carrier medium flowing through the receiver surface (2), a gas or gaseous mixture (11) adapted to absorb solar radiation (8) being supplied via gas channels to a region located externally in front of the receiver surface (2) the receiver surface (2) includes a plurality of absorber bodies (3) having lateral faces arranged at mutually spaced distances from each other, and the lateral faces of the absorber bodies (3) are arranged to limit the gas channels in a manner generating gas flow around each absorber body (3) along a periphery thereof.

2. The solar receiver as defined in claim 1 wherein the absorber bodies (3) are each arranged on a tubular support member (4) for discharge of heated air (10), and the gas channels are formed by the support members (4) and the absorber bodies (3).

3. The solar receiver as defined in claim 2 wherein the support members (4) are mounted by means of a lockable mounting device (13) allowing side mounting of the support members (4) relative to the receiver surface (2).

4. The solar receiver as defined in claim 3 wherein the mounting device (13) includes a plurality of peripheral engagement elements (14) pressed by a tensioning means (15) into a peripheral groove (17) of the support member (4).

5. The solar receiver as defined in claim 1 wherein the gas or gaseous mixture (11) functions as a cooling medium circulating through the solar receiver (1).

6. The solar receiver as defined in claim 1 wherein the gas or gaseous mixture (11) is colored.

7. The solar receiver as defined in claim 1 wherein components of the solar receiver (1) are made of ceramics.

8. A method of operating a solar receiver (1) for a solar-thermal power plant, comprising a plurality of absorber bodies (3) having gas channels arranged therebetween, wherein a gas or gaseous mixture (11) adapted to absorb the solar radiation (8) is guided through the gas channels to a region externally in front of the receiver surface (2) formed by the absorber bodies (3) where the gas is at least partially burnt to be then suctionally removed through the absorber bodies (3).

9. The method as defined in claim 8 wherein the gas (11) comprises air enriched with graphite.

10. The solar receiver as defined in claim 1 wherein the gas or gaseous mixture (11) is colored by graphite.

11. The solar receiver as defined in claim 1 wherein components of the solar receiver (1) are made of silicone carbide.

\* \* \* \* \*